(No Model.) 2 Sheets—Sheet 1.

W. A. COOLEY.
GAVEL DELIVERER FOR HARVESTERS.

No. 372,457. Patented Nov. 1, 1887.

Witnesses:
Aaron Miller
Alanson Kniffen

Inventor: Willard A. Cooley
per H. H. Cooley, Atty (No Model.) 2 Sheets—Sheet 2.
W. A. COOLEY.
GAVEL DELIVERER FOR HARVESTERS.
No. 372,457. Patented Nov. 1, 1887.
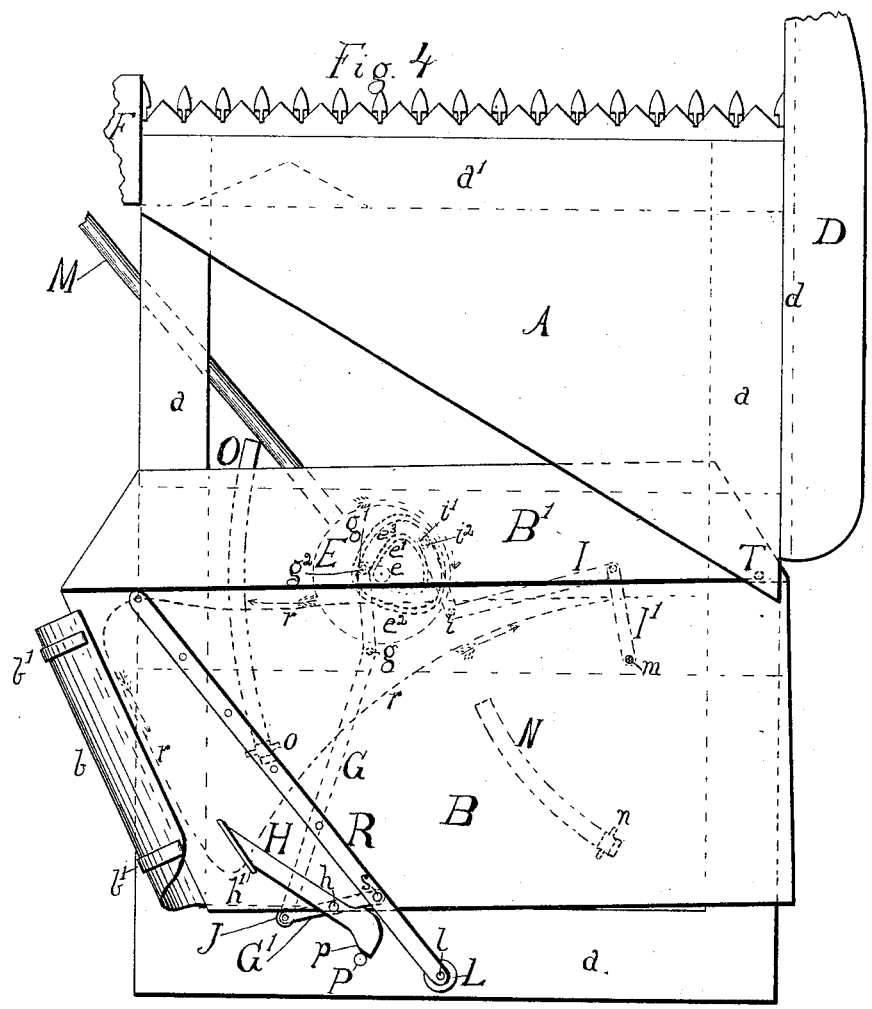
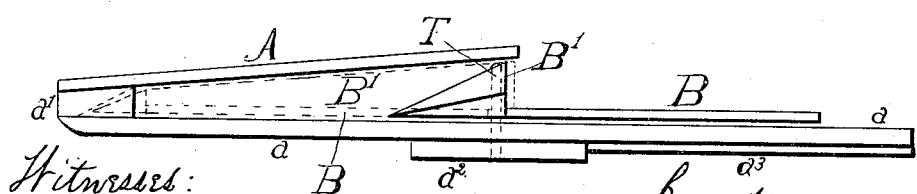

UNITED STATES PATENT OFFICE.

WILLARD A. COOLEY, OF SWEDEN, NEW YORK.

GAVEL-DELIVERER FOR HARVESTERS.

SPECIFICATION forming part of Letters Patent No. 372,457, dated November 1, 1887.

Application filed September 30, 1885. Serial No. 178,672. (No model.)

*To all whom it may concern:*

Be it known that I, WILLARD A. COOLEY, a citizen of the United States, residing in the town of Sweden, in the county of Monroe and State of New York, have invented a new and useful Gavel-Deliverer for Harvesters, of which the following is a specification.

The object of my invention is the construction of a gavel-deliverer, such that, without any change in its construction or the method of its operation, it may be used either as an ordinary self-rake (so called) or to deliver the gavels in suitable form and manner to a binding attachment located on a level, or nearly so, with the platform, and, further, to secure this result in a harvester with a forward cut and rear delivery.

In operating my invention it is preferred to use platforms of peculiar construction, as will be explained.

Figure 1:
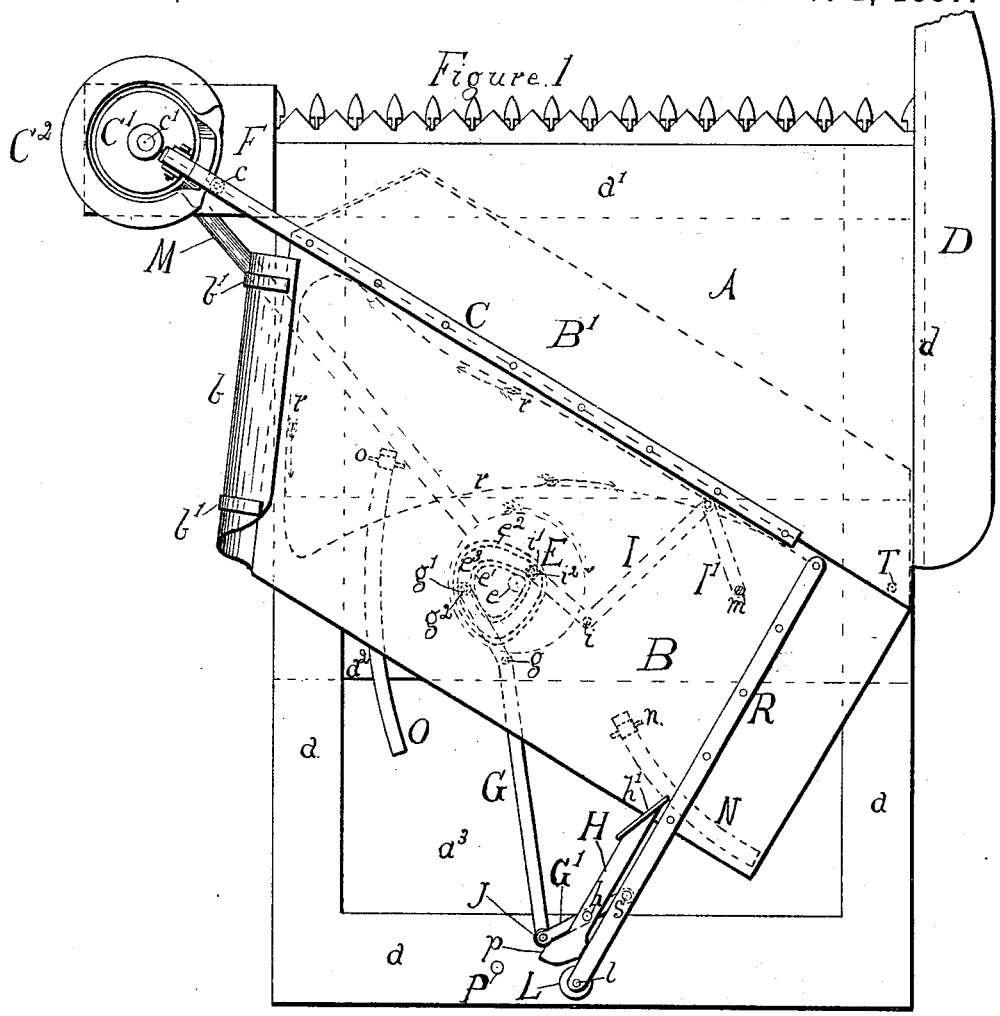
Figure 2:
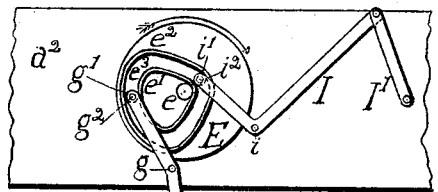
Figure 3:
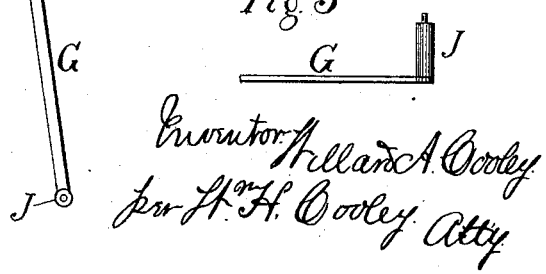

The accompanying drawings, illustrating my invention, are as follows:

Figure 1 is a plan view showing the rear or pivotal platform in position to receive the grain which the forward rake delivers thereon, sweeping it from the forward platform. Fig. 1 also shows this forward rake in the position it takes just as it is delivering the grain onto the rear or pivotal platform. In this figure various concealed parts and details of construction are indicated in dotted lines, as will be explained. Fig. 4 is a similar plan view, but with the forward rake and its appurtenances removed, and with the rear platform and its appurtenances shown in the position they take when just about to complete and deliver a gavel. Dotted lines are used in this figure also, the same as in Fig. 1. Fig. 2 shows, in detached plan view, the mechanism employed to actuate the rear platform and rake, showing them in the position they take when the pivotal platform B is thrown forward, as in Fig. 1. Fig. 3 shows, in side view, the rear portion of the lever G, seen in Figs. 1, 2, and 4. Fig. 5 is a left-hand side view of only the platforms A and B and the supporting frame-work of Figs. 1 and 4, with the platform B in a position parallel with the cut of the machine. In Fig. 5 there is also indicated in dotted lines the position assumed by the pivotal platform B when thrown forward in the position indicated in Fig. 1. All the devices seen in Fig. 2 are indicated in dotted lines in different positions in Figs. 1 and 4.

Similar letters refer to similar parts throughout the several figures.

Referring to Figs. 1, 4, and 5 of drawings, I employ a triangular-shaped platform, A, set so as to incline downward toward its forward edge and resting at such forward edge upon the cross-piece $a'$, suitably beveled therefor and secured upon the upper side of the other framework, $a$, partially indicated in dotted lines. Platform A, along its right-hand side, is secured to the vertical portion $d$ of the divider D, as indicated partially in Figs. 1 and 4, showing this vertical portion $d$ in dotted lines. This cross-piece $a'$ is cut away, so as to receive the left-hand end of the forward portion, B', of the platform B, as indicated in dotted lines in Figs. 1, 4, and 5.

The grain as it is cut falls upon the platform A, and is swept backward off from this platform by means of a rake, C, pivoted to the rake-wheel C', and controlled in its movement by means of the roller $c$, (indicated in dotted lines,) working upon the rake-cam $C^2$. This rake-cam $C^2$, as indicated in Fig. 1, may be supported by means of a suitable standard (not seen) resting upon a foundation-piece therefor, F, and this rake-cam is so formed as to cause the rake C to rise immediately after leaving the rear edge of platform A, and this rear edge of platform A, it will be noticed, as indicated in Figs. 1 and 4, (being shown partially in dotted lines in Fig. 1,) forms a radial line to the circle described by the rake C, thus securing a clean delivery of the grain from the platform A onto the platform B. When such platform B occupies the position shown in Fig. 1, the forward portion thereof, B', lies wholly under the platform A. This forward portion, B', of the platform B is wedge-shaped, sharpened at its forward edge. Its rear edge being carried considerably above the top of platform B, it forms a fence falling directly under the rear edge of platform A—that is, when the platform B is thrown forward, as is indicated in Fig. 1. Against this forward portion or fence, B', the butts of the grain delivered upon the platform B are held while such grain is being formed into a gavel. This platform B swings upon a bolt, T, (indicated in dotted lines in Figs. 1, 4, and 5,) and passing through the platform B at its right-hand side and near the rear edge of the forward portion or fence, B', and secured in the frame-work a, any suitable washer (not seen) may be used to raise the platform B slightly above the frame-work a, so as not to bear directly thereon.

Referring to Figs. 1, 2, and 4, beneath the platform B is located the cam-wheel E, having formed upon it the two curved raised portions $e'$ $e^2$, concentrically and similarly situated, and forming between them the channel $e^3$. Near the periphery of this cam-wheel E, and secured to the cross-piece $a^2$, are seen two bolts or rivets, $g$ $i$, which form fulcrums for and upon which are pivoted, respectively, the two bent levers G I. To the left-hand end of lever I and on its under side is revolubly secured the roller $i'$, (not seen, but partially indicated in dotted lines by means of the bolt or rivet $i^2$.) This roller $i'$ works in the channel $e^3$ of cam-wheel E. Pivoted to the other end of lever I is seen the forward end of the link I'. The rear end of this link I' is secured, by means of a screw-bolt, $m$, to the platform B. Also to the forward end of lever G and upon its under side there is secured a roller, $g'$, revolving upon the bolt or rivet $g^2$. This roller $g'$ also works in the channel $e^3$ on the cam-wheel E. The rear end of this lever G, as indicated also in side view in Fig. 3, has secured thereon the stud J. Pivoted to and swinging upon the upper end of this stud J is seen the link G'. The other end of this link G' is pivoted to the rake R by means of the bolt $s$. This rake R in turn swings upon the bolt or pin $l$, secured in the block L, which also forms a support for the rear end of rake R, and is in turn secured to the frame-work a. As seen in Figs. 1 and 4, by means of a bolt or rivet, $h$, there is pivoted to this link G', and at or near its center, the compressing-arm H, having secured at its forward end a vertically-placed piece of thin stuff, $h'$.

As indicated in Figs. 1 and 4, there is secured to the left-hand edge of platform B the sheet-iron gavel-case $b$ by means of the curved spring-arms $b'$ $b'$.

Referring to Figs. 1 and 4, starting with the platform B and the rake R and their actuating devices in the position indicated in Fig. 1, it will be readily understood that, a rotary motion being imparted to the cam-wheel E in the direction indicated by the curved and peripherally-arranged arrow shown in dotted lines, this platform B will be thrown backward, and at the same time the rake R will be caused to sweep across the platform B from right to left, the outermost tooth of the rake R passing across the platform B close to and nearly parallel with the fence formed by the forward portion, B', of the platform B, causing the platform B and rake R to assume the position indicated in Fig. 4; and at the same time the pressing-arm H, by means of the projection $p$ on the rear end thereof coming against the bolt or pin P, secured in frame-work a, is caused to assume the position indicated in Fig. 4.

Referring to Fig. 4, when the respective parts arrive at the position indicated therein, it will be seen that, the cam-wheel E being still further revolved, the rake R is first carried a little farther to the left, and almost at the same time the platform B begins to swing forward, passing over a considerable portion of its forward course before the rake R begins to swing back to the right. The result of this combined movement of the platform B and rake R is to cause the rake R to swing across the platform B in such a manner that the outer tooth of this rake R describes a course upon the platform B, (indicated in Figs. 1 and 4 in the dotted lines $r$ $r$ $r$,) the direction being indicated by means of arrows shown in dotted lines also near these dotted lines $r$ $r$ $r$. While the rake R is passing from left to right the rear end of this pressing-arm H, bearing against the rake R, causes it to take the position indicated in Fig. 1.

As indicated in dotted lines in Figs. 1 and 4, the platform B may receive support from and operate upon rollers $o$ and $n$, having suitable bearings (not shown) on the under side of platform B, and such rollers working, respectively, on the segmental tracks O and N, located beneath the platform B and secured upon the cross-piece $a^2$ and flooring $a^3$.

Referring to Figs. 1, 4, and 5, it will of course be understood that the rear edge of platform A is higher at the right-hand side than at the left-hand side; and for this reason, as seen in Fig. 5, it is desirable that the forward portion, B', of platform B should be thicker on its rear edge at its right-hand end than at its left-hand end, thus forming a fence to platform B increasing in height from left to right. Fig. 5 indicates the construction in this respect of platform B in side view, and also shows in dotted lines the relative position of such platform B to platform A when such platform B is thrown forward to the position indicated in Fig. 1.

Referring to Figs. 1, 2, 4, and 5, $a^2$ is a cross-piece extending under the frame a, so as to form a support for the devices actuating the platform B and rake R. Such devices located under the platform B may be contained almost entirely within the height taken up by the frame-work a, so that the platform B may swing so as to just clear the frame-work a, as is indicated in Fig. 5. The frame-work a has extending across its under side to the rear of cross-piece $a^2$ a flooring, $a^3$, so as to get a support for the tracks O and N; but it is desirable that it should be left open forward of the cross-piece $a^2$, so as to prevent grain or straw from clogging up under the platform A. It is also desirable that to the rake-wheel C' and to the cam-wheel E there should be imparted a constant and uniform rotary motion, causing each to revolve with equal speed. This may be accomplished by means of any suitable mechanism—such, for instance, as a shaft, M, (seen in Figs. 1 and 4,) working in bearings and having beveled pinions thereon (not seen) engaging beveled gear-wheels, (also not seen,) one located on the lower end of shaft $c'$, to which the rake-wheel C' is secured, the other located on the lower end of shaft $e$, to the upper end of which cam-wheel E is secured. The bearings for the shaft $c'$ may be located in the support for the rake-cam $C^2$, while the bearings for the shaft $e$ may be located in the cross-piece $a^2$.

The operation of my invention is substantially as follows: The grain as it is cut falls upon the platform A, and at regular intervals is swept or raked therefrom onto platform B in the manner already described, the rake C then rising from the platform A and passing on. The platform B is then swung backward in the manner already described, while the rake R is at the same time caused to sweep across this platform B from right to left, carrying the grain to the left-hand side thereof and forcing it into the sheet-iron gavel-case $b$. The rake R and the pressing-arm H, operating in the manner already described, press against the gavel so formed near the butts and heads, respectively, of the grain, and prevent the gavel from being carried forward by the platform B as such platform B is swung forward. The platform B and the gavel-case $b$ swing forward and away from the gavel, which is meanwhile held from being carried forward also by the rake R and the pressing-arm H. When the platform B and the gavel-case $b$ have moved so far forward as to be entirely removed from the gavel, then the gavel falls to the ground of its own weight, its greater portion lying to the left of and beyond the frame-work $a$. When a binder is used, it may be attached to the left of the frame-work $a$ and near the rear, so as to receive the gavel from the platform B, rake R, and pressing-arm H. The pressing-arm H acting together with the rake R, operating together in the manner indicated and described, there is afforded ample room for the free operation of the binder-needle arm between the rake R and the gavel or bundle and just in front of this pressing-arm H. The forward portion, B', of this platform B, being beveled down to form a sharp front edge, as indicated and described, tends to work under and lift the heads of the grain falling on platform A and near the left-hand side thereof, thus preventing the grain from being carried under the platform A by the platform B as the same is moving forward to receive the next raking of grain from the platform A. This forward portion, B', of the platform B, while such platform B is being moved back from the position indicated in Fig. 1 to that in Fig. 4, serves to keep the butts of the grain on the platform B even, and thus prevents the grain from stringing along, and also serves as a fence or guard against which the butts of the grain on platform B are swept by the action of rake R, operating in the manner described, thus tending to produce gavels even and true at their butt-ends, which would not be the case without the fence or guard B' or its equivalent.

I do not limit myself to the special forms of construction herein shown and described, as very obviously, without departing from the spirit of my invention, it may be greatly modified in form and details of construction, so as to adapt it to use upon different machines.

What I claim is—

1. The combination of platform A and means for supporting the same, platform B, having the forward portion, B', thereon, cam-wheel E, lever I, means for supporting such platform B and for actuating lever I from cam-wheel E, link I', bolt $m$, bolt or pin T, and means for supporting such cam-wheel E, all as shown and described.

2. The combination of platform A and means for supporting the same, platform B, having the forward portion, B', and the gavel-case $b$ thereon, means for sweeping the grain falling on platform A off said platform and onto platform B, cam-wheel E, lever I, means for supporting platform B, means for actuating lever I from cam-wheel E and for operating platform B from lever I, with lever G, means for actuating lever G from such cam-wheel E and for supporting such cam-wheel E, link G', and rake R, all constructed, arranged, and operating substantially as shown and described.

3. The combination of platform A and means for supporting the same, platform B, having the forward portion, B', and the gavel-case $b$ thereon, means for sweeping the grain falling on platform A off platform A and onto platform B, cam-wheel E, lever I, means for supporting such platform B, means for actuating lever I from cam-wheel E and for operating platform B from lever I, with lever G, means for actuating lever G from cam-wheel E and for supporting cam-wheel E, link G', rake R, pressing-arm H, with the projection $p$ thereon, and pin P, all constructed, arranged, and operating substantially as shown and described.

4. The combination of cam-wheel E, lever G, means for operating lever G from cam-wheel E, link G', rake R, bolt or pin $l$, block L, pressing-arm H, with the projection $p$ thereon, and pin P, and means for supporting block L and pin P, all substantially as and for the purpose described.

5. A fixed platform arranged to maintain at all times the same relation to the cutting apparatus, a pivotal platform, means for sweeping the grain from such fixed platform onto such pivotal platform, and means for swinging such pivotal platform and at the same time gathering the grain thereon into a gavel and forming such gavel upon such pivotal platform at one side thereof, such pivotal platform arranged to swing partially under such fixed platform, substantially as shown and described.

6. A fixed platform arranged to maintain at all times the same relation to the cutting apparatus, a pivotal platform, means for sweeping the grain from such fixed platform onto such pivotal platform, such pivotal platform having a fence or equivalent device thereon, and means for swinging such pivotal platform and at the same time gathering the grain delivered thereon into a gavel and for forming such gavel upon such pivotal platform at one side thereof, such that the butts of the grain shall at all times be kept against such fence on such pivotal platform, all substantially as set forth.

7. A fixed platform arranged to maintain at all times the same relation to the cutting apparatus, a pivotal platform, means for sweeping the grain from such fixed platform onto such pivotal platform, and means for swinging such pivotal platform and at the same time gathering the grain thereon into a gavel and forming such gavel upon such pivotal platform at one side thereof, substantially as set forth.

8. A fixed platform arranged to maintain at all times the same relation to the cutting apparatus, a pivotal platform arranged to swing partially under such fixed platform, means for sweeping the grain from such fixed platform onto such pivotal platform, means for swinging such pivotal platform and at the same time gathering the grain thereon into a gavel and forming such gavel upon such pivotal platform at one side thereof, and means for discharging such completed gavel from such pivotal platform while such pivotal platform is returning to a position where it may receive another raking or delivery of grain from such fixed platform.

9. A fixed platform arranged to maintain at all times the same relation to the cutting apparatus, a pivotal platform, means for sweeping the grain from such fixed platform onto such pivotal platform, such pivotal platform having a fence or equivalent device thereon, and means for swinging such pivotal platform and at the same time gathering the grain delivered thereon into a gavel and for forming such gavel upon such pivotal platform at one side thereof, such that the butts of the grain shall at all times be kept against such fence on such pivotal platform, and means for discharging such completed gavel from such pivotal platform while such pivotal platform is returning to a position where it may receive another raking or delivery of grain from such fixed platform, as shown and described.

10. A fixed platform arranged to maintain at all times the same relation to the cutting apparatus, a pivotal platform, means for sweeping the grain from such fixed platform onto such pivotal platform, means for swinging such pivotal platform and at the same time gathering the grain thereon into a gavel and forming such gavel upon such pivotal platform at one side thereof, and means for discharging such completed gavel from such pivotal platform while such pivotal platform is returning to a position where it may receive another raking or delivery of grain from such fixed platform.

WILLARD A. COOLEY.

Witnesses:
AARON MILLER,
ALANSON KNIFFEN.